United States Patent [19]

Kimula et al.

[11] Patent Number: 5,229,897
[45] Date of Patent: Jul. 20, 1993

[54] TAPE CASSETTE LOADING APPARATUS WHICH CAN SMOOTHLY OPERATE AND REMOVE STATIC ELECTRICITY ON A TAPE CASSETTE

[75] Inventors: Katsuhiko Kimula, Tokyo; Hiroyuki Miyamoto, Tokorozawa, both of Japan

[73] Assignee: TEAC Corporation, Japan

[21] Appl. No.: 712,333

[22] Filed: Jun. 7, 1991

[30] Foreign Application Priority Data

Jun. 20, 1990 [JP] Japan .................................. 2-161881

[51] Int. Cl.⁵ ............................................. G11B 5/008
[52] U.S. Cl. ..................................... 360/96.5; 360/96.6
[58] Field of Search ............................. 360/96.5, 96.6

[56] References Cited
U.S. PATENT DOCUMENTS

| | | | |
|---|---|---|---|
| 4,688,695 | 8/1987 | Hirohata | 360/96.6 X |
| 4,792,872 | 12/1988 | Nakanishi et al. | 360/96.5 |
| 4,918,552 | 4/1990 | Tsutsumi et al. | 360/96.5 |
| 5,038,236 | 8/1991 | Nakahara et al. | 360/96.5 |
| 5,119,251 | 6/1992 | Matsuda | 360/96.5 |

FOREIGN PATENT DOCUMENTS 57-58746 12/1982 Japan .
59-42559 3/1984 Japan .

*Primary Examiner*—John H. Wolff
*Attorney, Agent, or Firm*—Andrus, Sceales, Starke & Sawall

[57] ABSTRACT

A tape cassette loading apparatus includes a holder which can move between a cassette insert/eject position at which a tape cassette is inserted therein and/or ejected therefrom and a cassette loading position at which the tape cassette is loaded in the cassette loading apparatus, and a cassette pushing member which pushes so as to fix the tape cassette to be inserted. Since a single forcing member functions to force the holder from the cassette loading position to the cassette insert/eject position and the cassette pushing member which pushes and fixes the tape cassette inserted in the holder, the number of elements of the apparatus of the present invention is fewer than the conventional apparatus.

13 Claims, 14 Drawing Sheets

TAPE CASSETTE LOADING APPARATUS WHICH CAN SMOOTHLY OPERATE AND REMOVE STATIC ELECTRICITY ON A TAPE CASSETTE

BACKGROUND OF THE INVENTION

The present invention relates to a tape cassette loading apparatus.

The conventional tape cassette loading apparatus shown in Japanese Patent Publication No.57-58746 comprises flat spring which pushes and holds a tape cassette in a holder, a mechanism which supports the holder movably between a cassette insert/eject position and a cassette loading position, and a coil spring which forces the holder toward the cassette insert/eject position. In the tape cassette loading apparatus, the tape cassette is manually inserted into the holder against the force of the flat spring and manually moved with the holder to the cassette loading position against the force of the coil spring. Incidentally, since the case of the tape cassette is made of synthetic resin including an antistatic conductive agent, electrostatic voltage of several thousand to several tens of thousands generated during reviewing or cueing of the tape cassette is prevented from being charged in the case.

Incidentally, another tape cassette loading apparatus in which, when the tape cassette is inserted and/or ejected, the holder is opened quickly during the first half of the operation of the holder and slowly during the second half thereof and softly stopped, as shown in FIG. 1I, so as to emit a high-grade atmosphere, has been proposed. FIG. 1 shows a relationship between an opening speed and the opening angle of the holder. The holder opens from the cassette loading position $P_0$ to the cassette insert/eject position $P_3$. The tape cassette is inserted into or ejected from the holder located at the cassette insert/eject position, and it is loaded into the tape cassette loading apparatus when the holder is located at the cassette loading position. This tape cassette loading apparatus further comprises a damper mechanism for absorbing the opening speed of the holder.

However, the above conventional tape cassette loading apparatuses have the following disadvantages:

1. Because of the presence of both the coil spring and the flat spring, the number of elements increases and the assembling operation becomes troublesome and complicated.

2. It is inconvenient to manually move the holder with the tape cassette against the flat spring and the coil spring.

3. Although it is conceivable to remove the electrostatic voltage applied on the tape cassette by grounding the flat spring, since the flat spring is coupled with the tape cassette by means of a point contact or a line contact, it cannot completely remove the electrostatic voltage. Therefore, dust often get attached to the tape surface of the tape cassette to damage it, and consequently the output signal outputted from the tape cassette often drops out.

4. If the opening speed of the holder is absorbed only by the damper, the relationship between the opening speed and angle cannot duplicate the course of the ideal line shown in FIG. 1I, but instead reveals the line shown in FIG. 1II, in which the holder cannot sufficiently decelerate and fails to emit the high-grade atmosphere. On the other hand, if the damper having a stronger damper effect is used, the holder is decelerated during the first half of the operation thereof, and consequently it takes a lot of time to move to the cassette insert/eject position.

SUMMARY OF THE INVENTION

Accordingly, it is a general object of the present invention to provide a novel and useful tape cassette loading apparatus in which the above disadvantages are eliminated.

Another object of the present invention is to provide a tape cassette loading apparatus which can be conveniently operated and in which the number of elements thereof is fewer than in that of the conventional apparatus.

Still another object of the present invention is to provide a tape cassette loading apparatus which effectively removes the electrostatic voltage to be charged in the case of the tape cassette.

A further object of the present invention is to provide a tape cassette loading apparatus in which the holder opens quickly during the first half of the operation thereof and slowly during the second half of the operation thereof in order for the apparatus to emit the high-grade atmosphere.

The more specific object of the present invention is to provide a tape cassette loading apparatus which comprises a base, a holder, movably engaged with the base between a cassette insert/eject position at which a tape cassette is inserted therein and/or ejected therefrom and a cassette loading position at which the tape cassette is loaded in the cassette loading apparatus, a forcing member, located in the base, which forces the holder in a direction from the cassette loading position to the cassette insert/eject position, and a cassette pushing member, pivotally supported in the holder and movable with the holder, which is engaged with the forcing member so that the cassette pushing member can push and fix the tape cassette to be inserted in the holder, which cassette pushing member can be engaged with the base so as to pivot separately from the tape cassette while the holder is moving from a middle position between the cassette loading position and the cassette insert/eject position to the cassette insert/eject position.

Moreover, the cassette pushing member in the above tape cassette loading apparatus may have a conductive and elastic member via which the cassette pushing member pushes the tape cassette, the conductive and elastic member being coupled to the tape cassette by means of a surface contact.

Furthermore, the cassette pushing member may have a first engaging part having a first shape, and the base may have a second engaging part having a second shape which can be engaged with the first engaging part.

Another more specific object of the present invention is to provide a tape cassette loading apparatus which comprises a base, a holder, engaged with the base, which moves between a cassette insert/eject position at which a tape cassette is inserted into and/or ejected from the holder and a cassette loading position at which the tape cassette is loaded in said cassette loading apparatus, moving means for moving the holder between the cassette loading position and the cassette insert/eject position, decelerating means for decelerating the holder by means of more than two steps while the holder is moving from the cassette loading position to the cassette insert/eject position.

According to the first aspect of the present invention, since the forcing member serves as the conventionally-used flat spring and the coil spring, the number of elements of the present tape cassette loading apparatus is smaller than that of the conventional one. In addition, in the present invention, it is easy to move the holder against only the force of the forcing member while, in the conventional apparatus, it is convenient to move the holder against the force of the flat spring and the coil spring. Moreover, since the cassette pushing member is engaged with the fixed base, the holder is decelerated at the middle position. According to the second aspect of the present invention, since the electrostatic voltage can be effectively removed because of the surface contact between the conductive and elastic member and the tape cassette to be inserted, the dust never gets attached to the tape surface of the tape cassette and the output signal thereof never drops out. According to the third aspect of the present invention, since the holder is decelerated by the first and second engaging parts or the decelerating means, the tape cassette loading apparatus can emit the high-grade atmosphere.

Other objects and further features of the present invention will be apparent from the following detailed description when read in conjunction with the accompanying drawings.

DESCRIPTION OF THE PREFERRED EMBODIMENTS

Figure 1:
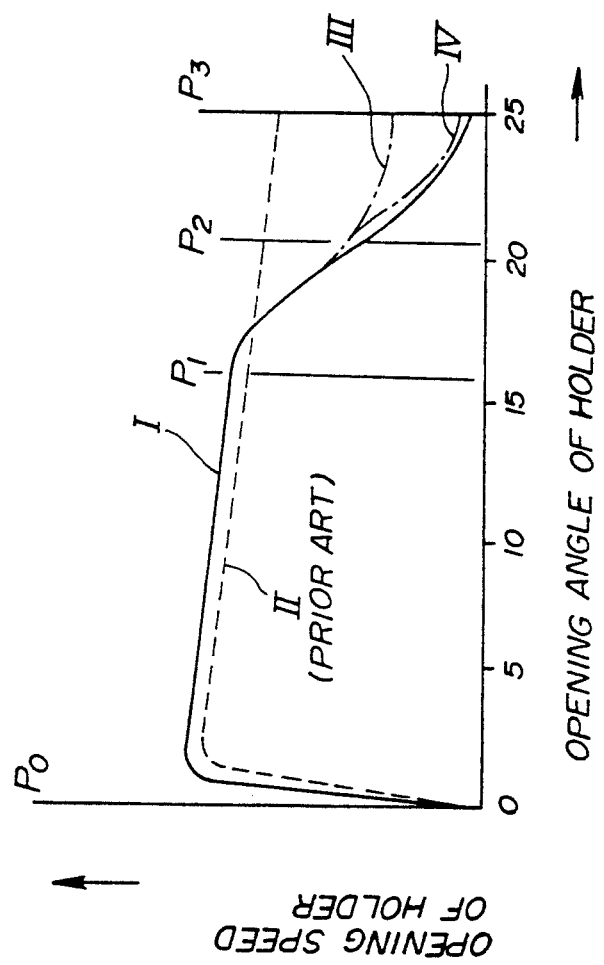
FIG. 1 shows a relationship between the opening speed and the opening angle of a holder.
Figure 2:
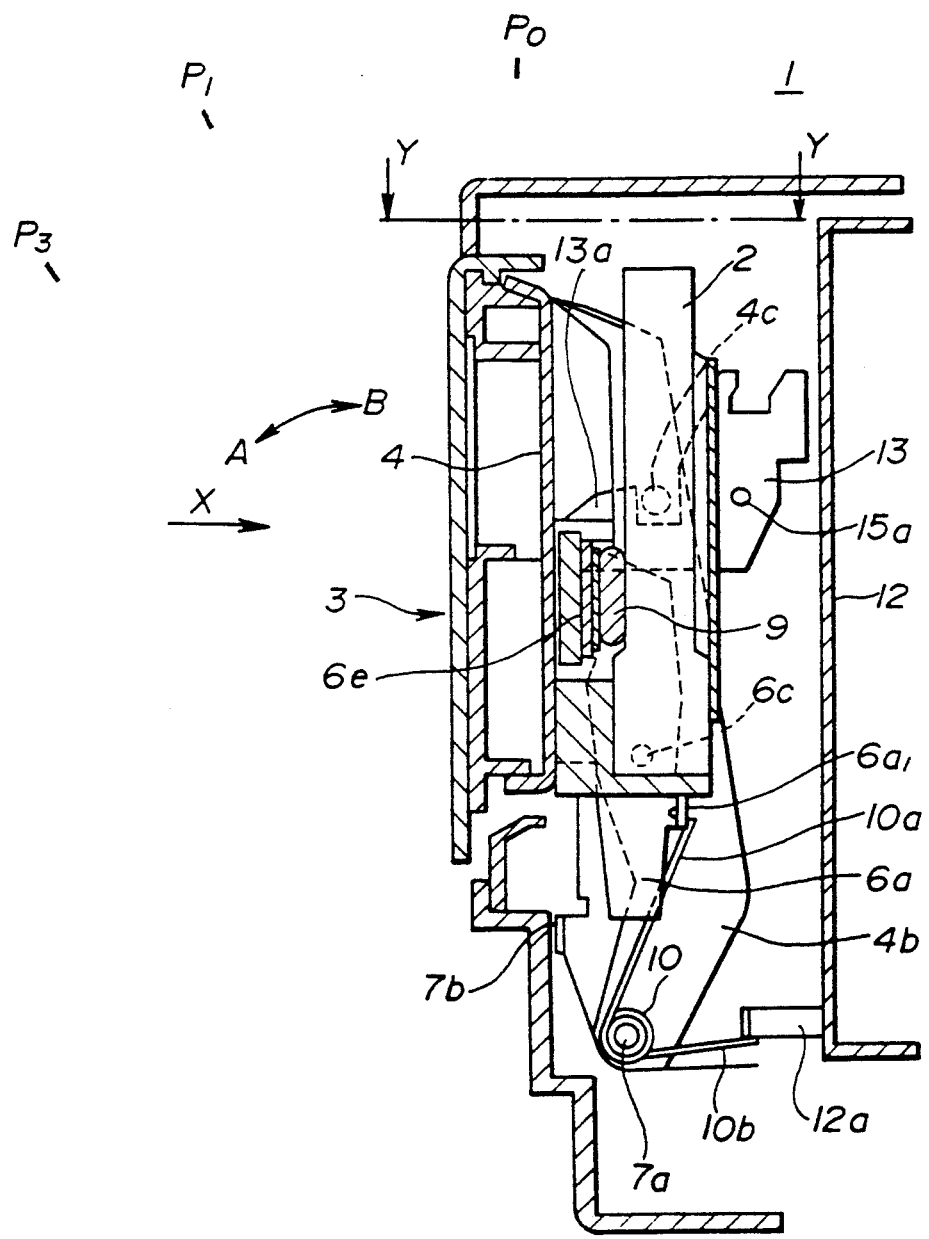
FIG. 2 shows a cross-sectional view of the tape cassette loading apparatus of a first embodiment according to the present invention when the holder is located at a cassette loading position.
Figure 3:
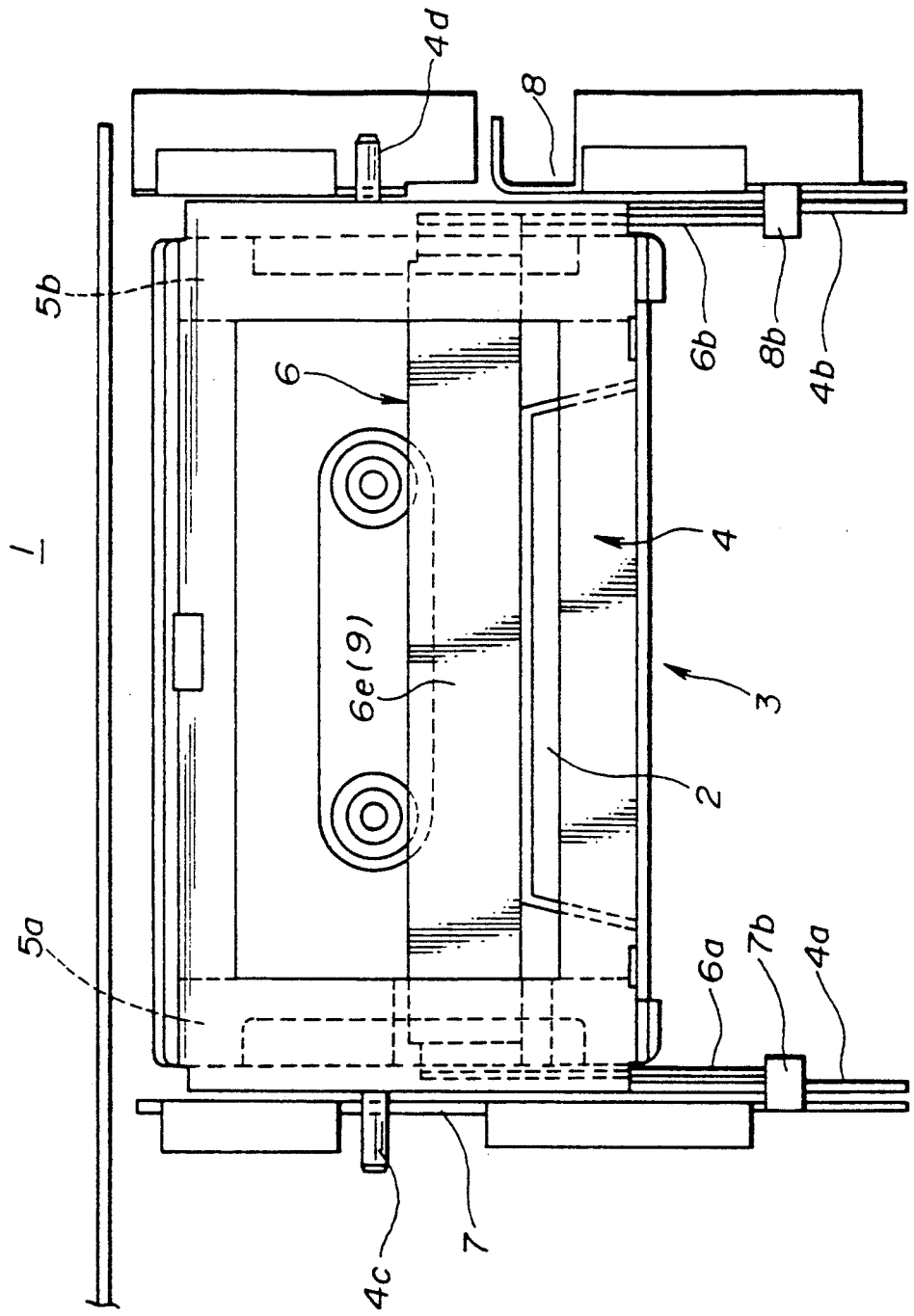
FIG. 3 shows a plane view of the tape cassette loading apparatus shown in FIG. 2 viewed from a direction X.
Figure 4:
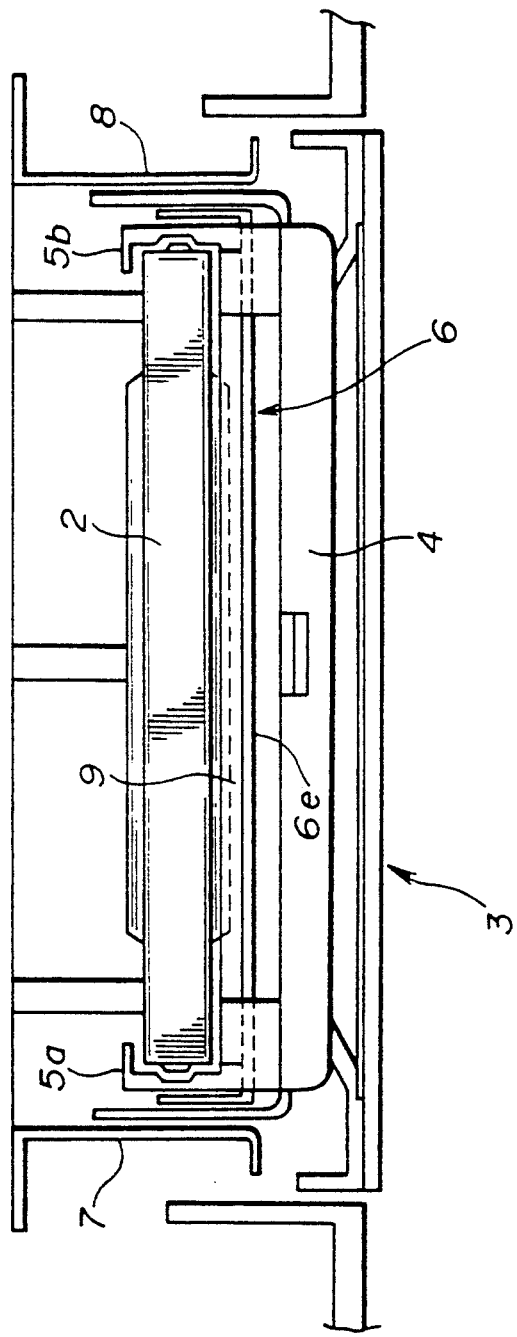
FIG. 4 shows a plane view of the tape cassette loading apparatus shown in FIG. 2 viewed from a direction Y.
Figure 5:
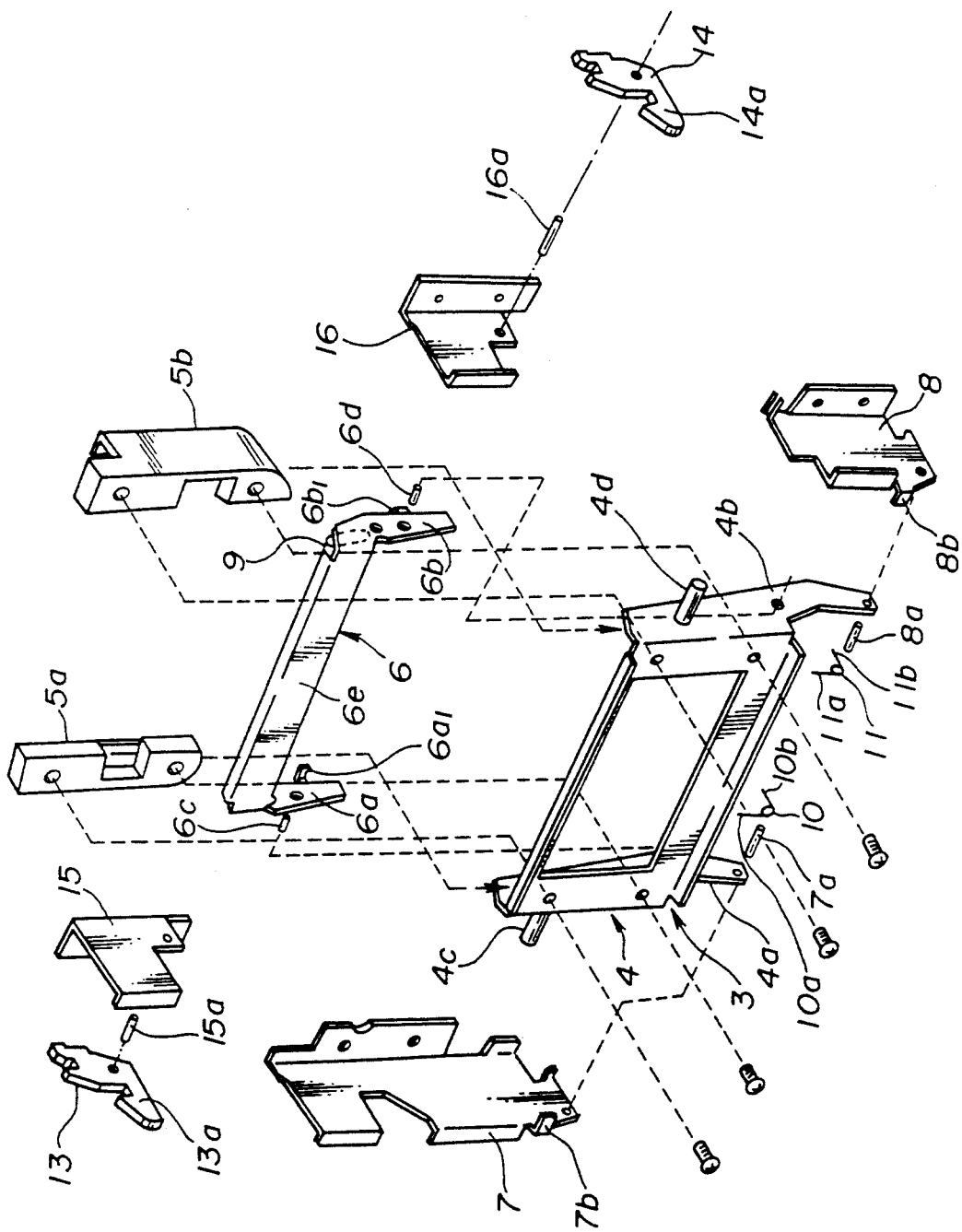
FIG. 5 shows an exploded perspective view of the holder.

A description will now be given of the tape cassette loading apparatus of the first embodiment according to the present invention with reference to FIGS. 2 to 7. FIG. 2 shows a cross-sectional view of the tape cassette loading apparatus of the first embodiment according to the present invention when the holder 3 is located at the cassette loading position $P_0$. FIG. 3 shows a plane view of the tape cassette loading apparatus shown in FIG. 2 viewed from a direction X, and FIG. 4 shows a plane view of the tape cassette loading apparatus shown in FIG. 2 viewed from a direction Y. FIG. 5 shows an exploded perspective view of the holder 3.

The tape cassette loading apparatus 1 comprises a base (not shown), the holder 3, a cassette pushing member 6, and torsion coil springs 10 and 11.

The holder 3 is engaged with the base pivotally between the cassette insert/eject position $P_3$ and the cassette loading position $P_0$. The tape cassette 2 is inserted into the holder 3 located at the cassette insert/eject position $P_3$, and loaded in the tape cassette loading apparatus 1 when the holder 3 is located at the cassette loading position $P_0$. The holder 3 comprises a plate frame 4 and cassette holding members 5a and 5b. As shown in FIG. 5, the cassette holding members 5a and 5b are screwed into the front of the frame 4. The cassette holding members 5a and 5b form a concave portion in which the tape cassette 2 is inserted and fixed. As shown in FIGS. 2 to 5, the frame 4 is grounded and supported pivotally around shafts 7a and 8a, each of which penetrate into a corresponding one of brackets 7 and 8 fixed in the base. Therefore, the holder 3 is supported pivotally from the cassette loading position $P_0$ shown in FIG. 2 to the cassette insert/eject position shown in FIG. 6. The frame 4 comprises arms 4a and 4b and projecting pins 4c and 4d, each of which projects from a corresponding one of the arms 4a and 4b.

The cassette pushing member 6 pushes the tape cassette 2 when the holder 3 is located at the cassette loading position $P_0$. The cassette pushing member 6 comprises, as shown in FIG. 5, arms 6a and 6b and pushing part 6e. The arms 6a and 6b are respectively located at either end of the pushing part 6e, and pivotally engaged with the arms 4a and 4b of the frame 4 via shafts 6c and 6d. Therefore, the cassette pushing member 6 pivots around the shafts 7a and 8a with the holder 3, and additionally it can pivot around the shafts 6c and 6d separately from the holder 3. The pushing part 6e has a conductive and elastic member 9 on the whole front surface thereof. The conductive and elastic member 9, which includes an antistatic additive and has abundant elasticity and conductivity because of a surface resistance 0.3Ω cm. The pushing part 6e of the cassette pushing member 6 pushes the tape cassette 2 via the conductive and elastic member 9 when the holder 3 is located at the cassette loading position. Since the conductive and elastic member 9 is located along the whole front surface of the pushing part 6e, it can be coupled to the tape cassette 2 via a broader area contact than that of the conventional flat spring. Therefore, the electrostatic voltage which is generated during the loading, reviewing, or cueing of the tape cassette 2 can be easily removed.

The torsion coil springs 10 and 11 force the holder 3 toward the cassette insert/eject position. The torsion coil springs 10 and 11 are respectively engaged with the shafts 7a and 8a, as shown in FIG. 5. Each of the ends 10a and 11a of each of the corresponding torsion coil springs 10 and 11 is respectively engaged with a corresponding one of the arms 6a and 6b of the cassette pushing member 6 at the respective engaging parts $6a_1$ and $6b_1$. Each of the other ends 10b and 11b of each of the corresponding torsion coil springs 10 and 11 is respectively engaged, as shown in FIG. 2, with a corresponding one of engaging parts 12a and 12b (not shown) which project from a bracket 12. Therefore, the torsion coil springs 10 and 11 force the holder 3 toward the cassette insert/eject position via the cassette pushing member 6.

Hooks 13 and 14 shown in FIGS. 2 and 5 are supported pivotally around shafts 15a and 16a, each of which respectively project from a corresponding one of brackets 15 and 16 fixed on the base. The hooks 13 and 14 are respectively forced in a clockwise direction (direction B) shown in FIG. 7 by coil springs (not shown). These hooks 13 and 14 respectively have a corresponding one of tabs 13a and 14a, which are respectively engaged with the projecting pins 4c and 4d when the holder 3 is located at the cassette loading position $P_0$ in order to fix the holder 3. Since the hooks 13 and 14 are engaged with an eject button (not shown), they pivot counterclockwise in cooperation with the pushing of the eject button.

Figure 6:
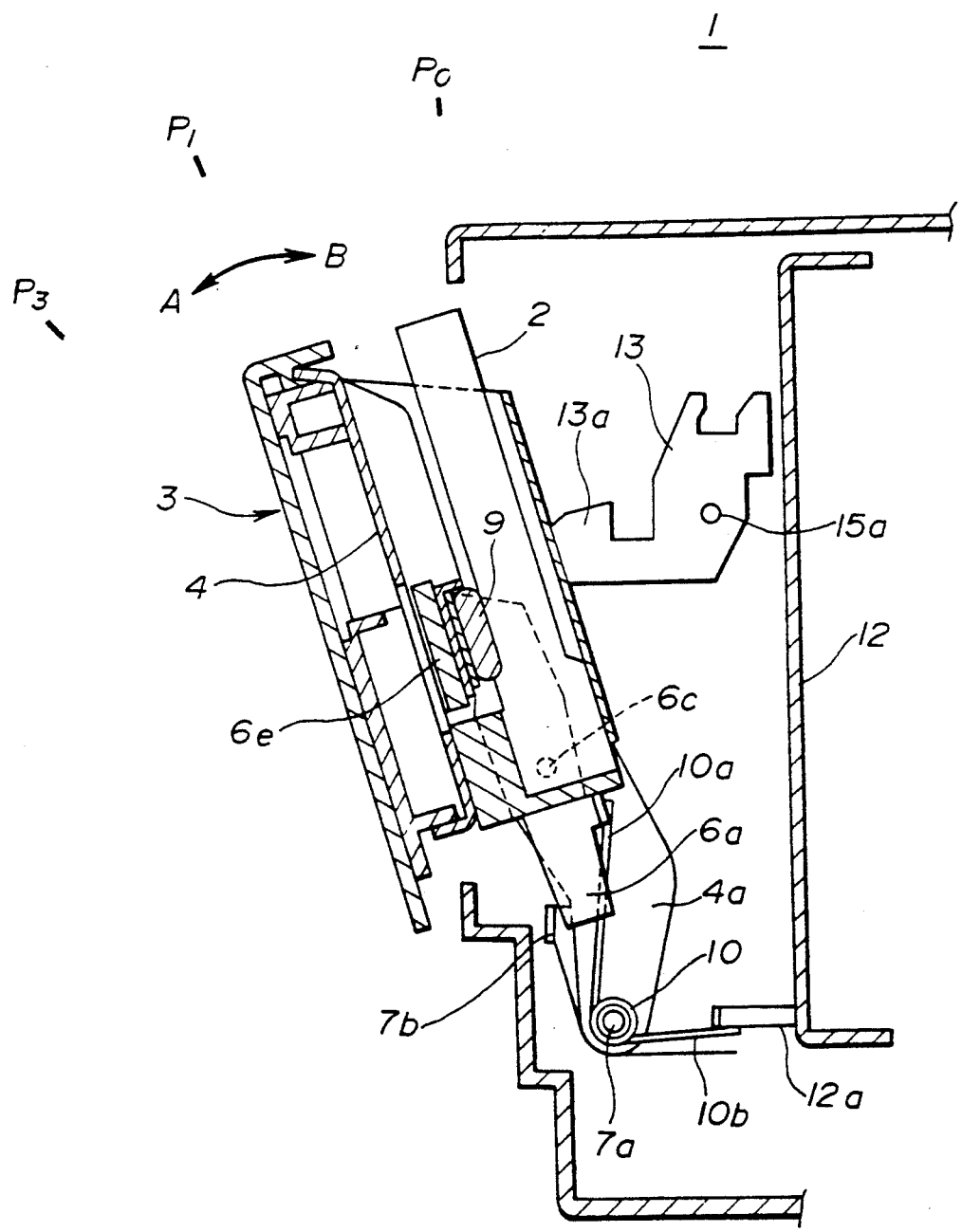
FIG. 6 shows a cross-sectional view of the tape cassette loading apparatus in which a cassette pushing member touches a projecting member.
Figure 7:
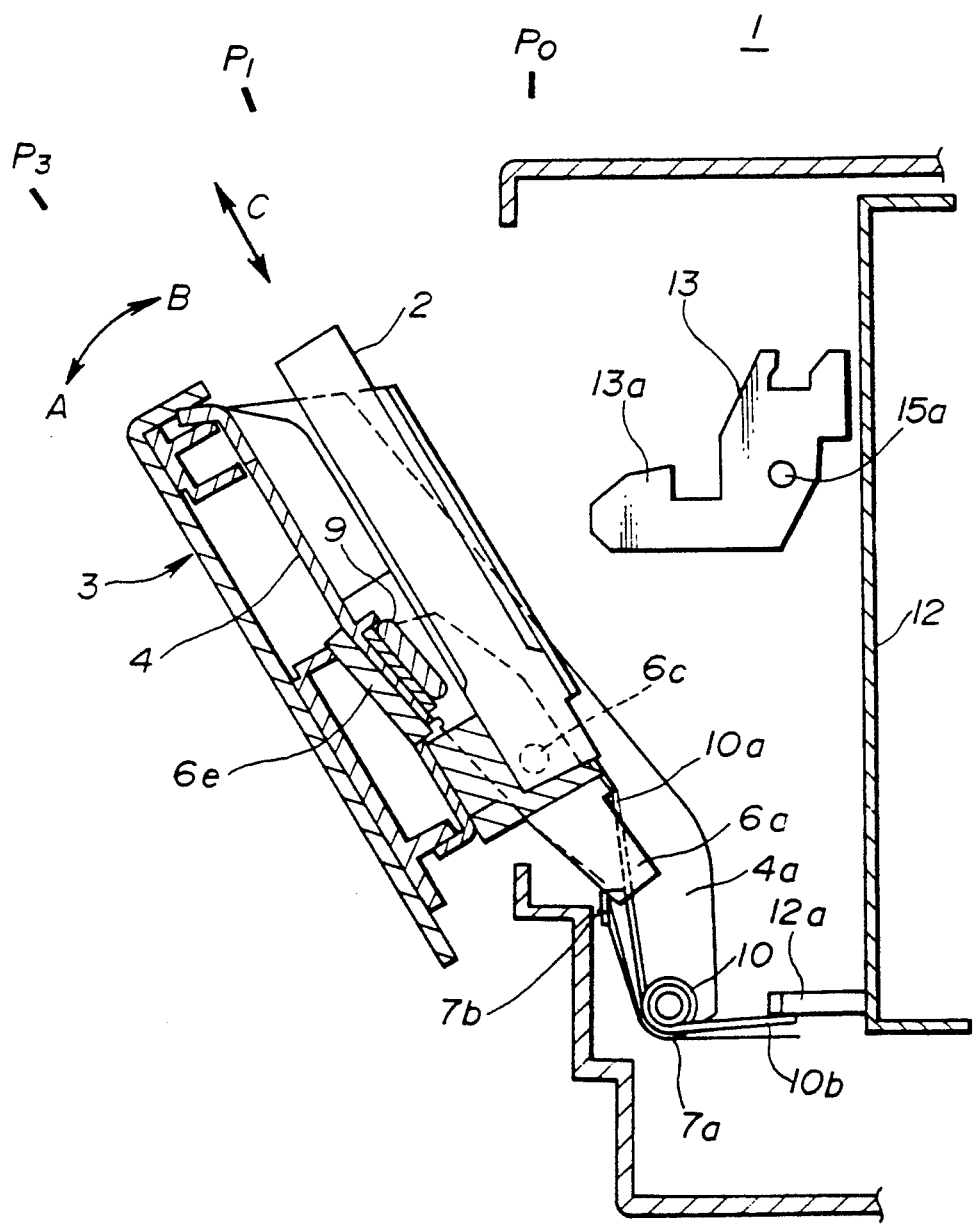
FIG. 7 shows a cross-sectional view of the tape cassette loading apparatus shown in FIG. 2 when the holder is located at a cassette insert/eject position.

A description will now be given of the operation of the tape cassette loading apparatus 1 with reference to FIGS. 1, 2, and FIGS. 5 to 7. FIG. 6 shows a cross-sectional view of the tape cassette loading apparatus 1 in which a cassette pushing member 6 touches the projecting members 7b and 8b. FIG. 7 shows a cross-sectional view of the tape cassette loading apparatus 1 when the holder 3 is located at a cassette insert/eject position $P_3$.

When the tape cassette 2 is inserted into or ejected from the tape cassette loading apparatus 1, the eject button (not shown) is pushed to pivot the hooks 13 and 14 counterclockwise (in a direction A). Thus, the holder 3 is released from being held by the hooks 13 and 14, and consequently it is rotated by the torsion coil springs 10 and 11 around the shafts 7a and 8a in the direction A. As shown in FIG. 6, when the holder 3 is located at a middle position $P_1$ between the cassette loading position and the cassette insert/eject position, the arms 6a and 6b of the cassette pushing member 6 respectively touch the projecting members 7b and 8b of the brackets 7 and 8. The cassette pushing member 6 pivots in the direction A with the holder 3 around the shafts 7a and 8a while the holder 3 rotates from the cassette loading position $P_0$ to the middle position $P_1$, however, it pivots in the direction A separately from the holder 3 around the shafts 6c and 6d while the holder rotates from the middle position $P_1$ to the cassette insert/eject position $P_3$. As a result, the tape cassette 2 can be inserted and or ejected. In addition, since the arms 6a and 6b respectively touch the projecting members 7b and 8b so that a length between a rotating center and a point of action of the spring force, the holder 3 is decelerated at the middle position $P_1$, so that the relationship between the opening speed and angle of the holder 3 becomes as shown in FIG. 1III. Therefore, the tape cassette loading apparatus 1 can emit the high-grade atmosphere.

When the tape cassette is loaded, as shown in FIG. 7, the tape cassette 2 is inserted into or ejected from the holder 3 which is located at the cassette insert/eject position $P_3$. When the tape cassette 2 is inserted into the holder 3, the tape cassette 2 is inserted into the concave part formed by the cassette holding members 5a and 5b. Subsequently, the holder 3 is rotated from the cassette insert/eject position $P_3$ to the cassette loading position $P_0$ against the force of the torsion coil springs 10 and 11. When the holder 3 is rotated from the middle position $P_1$ to the cassette loading position $P_0$, the arms 6a and 6b of the cassette pushing member 6 are respectively separated from the corresponding projecting members 7b and 8b. The cassette pushing member 6 is rotated in the direction B by the force of the torsion coil springs 10 and 11. Consequently, the conductive and elastic member 9 touches and pushes the tape cassette 2. When the holder 3 rotates to the cassette loading position $P_0$, the projecting pins 4c and 4d of the frame 4 are respectively engaged with the corresponding tabs 13a and 14a of the corresponding hooks 13 and 14, and the holder 3 is fixed at the cassette loading position $P_0$. The torsion coil springs 10 and 11 force the holder in the direction A, and push the tape cassette 2 via the cassette pushing member 6 in synchronization with the holder 3 rotating from the middle position $P_1$ to the cassette loading position $P_0$. Therefore, since the torsion coil springs 10 and 11 respectively serve as a conventionally-used flat spring and a coil spring, the number of the elements of the tape cassette loading apparatus 1 becomes fewer than that of the conventional apparatus. On the other hand, unlike the conventional tape cassette loading apparatus in which the holder has to be moved against the force of the flat spring and coil spring, the holder 3 has to be conveniently moved only against the force of the torsion springs 10 and 11. Moreover, since the conductive and elastic member 9 is coupled to the tape cassette 2 by the relatively broad area contact to remove the electrostatic voltage charged on the tape cassette 2, dust hardly gets attached to the tape surface and the output signal never drops out.

A description will now be given of the tape cassette loading apparatus of the second embodiment according to the present invention with reference to FIGS. 8 to 15. Those elements which are the same as corresponding elements in the first embodiment are designated by the same reference numerals, and a description thereof will be omitted. The tape cassette loading apparatus 20 comprises a base (not shown), a holder 21, a cassette pushing member 22, and the torsion coil springs 10 and 11. This embodiment differs from the first embodiment in that the holder 21 is decelerated in two steps. Thus, a cassette pushing member 22 and brackets 25 and 25 have shapes different from those of the cassette pushing member 6 and the brackets 7 and 8, respectively.

The holder 21 is supported pivotally between the cassette loading position $P_0$ and the cassette insert/eject position $P_3$ via the arms 21a and 21b and shafts 24a and 25a penetrating into the brackets 24 and 25, respectively.

Figure 8:
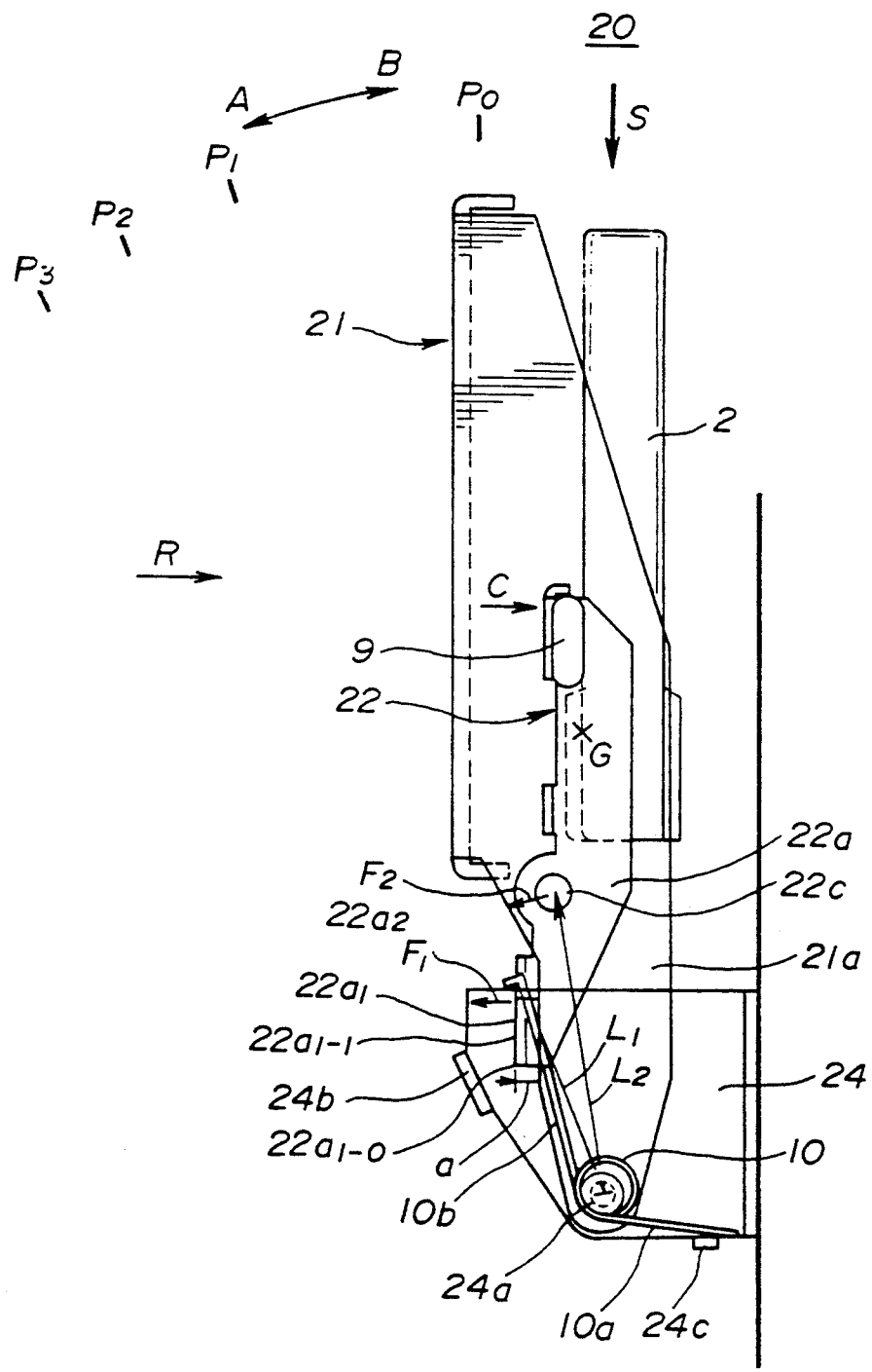
FIG. 8 shows a cross-sectional view of the tape cassette loading apparatus of the second embodiment according to the present invention when the holder is located at the cassette loading position.
Figure 9:
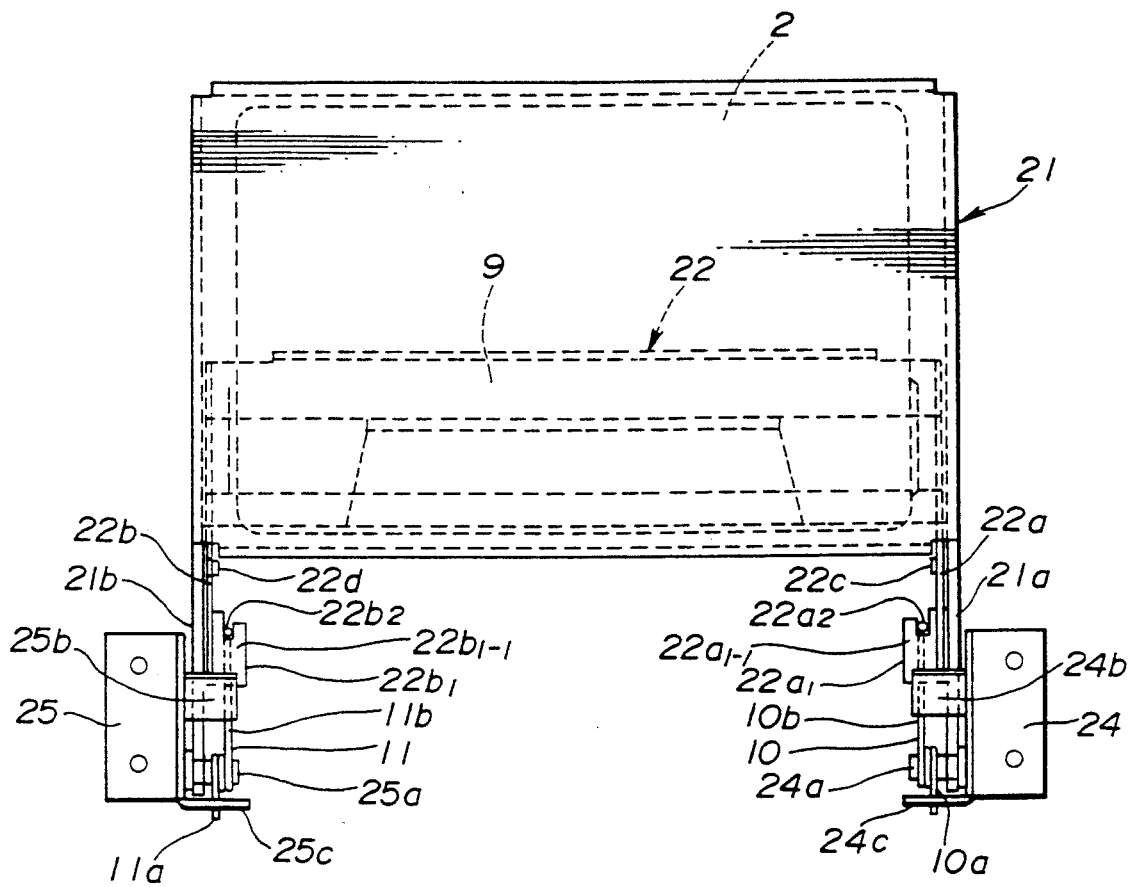
FIG. 9 shows a plane view of the tape cassette loading apparatus shown in FIG. 8 viewed from a direction R.
Figure 10:
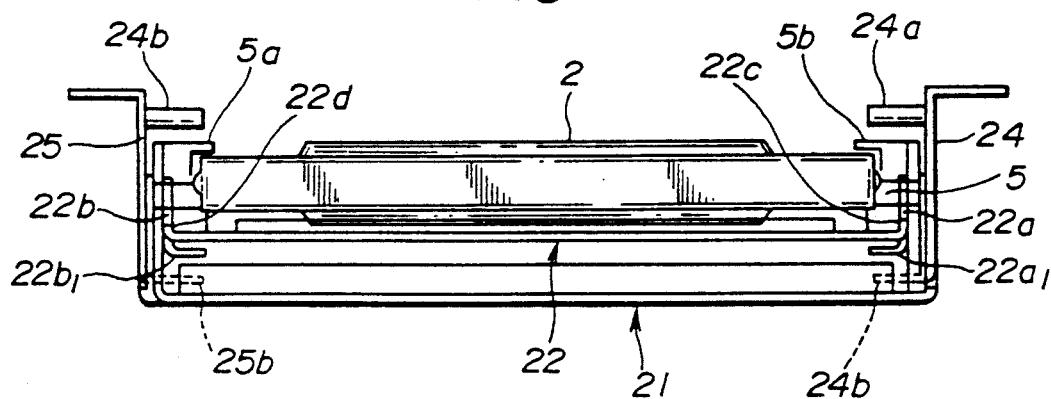
FIG. 10 shows a plane view of the tape cassette loading apparatus shown in FIG. 8 viewed from a direction S.

The cassette pushing member 22 comprises arms 22a and 22b and the conductive and elastic member 9. Since each of the approximate centers of the arms 22a and 22b is respectively penetrated by a corresponding one of shafts 22c and 22d, the cassette pushing member 22 can pivot separately from the holder 21. The arms 22a and 22b respectively have bending parts $22a_1$ and $22b_1$ at a respective end thereof. The bending parts $22a_1$ and $22b_1$ project, as shown in FIG. 8, into the arms 22a and 22b by "a", respectively. The brackets 24 and 25 respectively have projecting members 24b and 25b each of which touches a corresponding one of the arms 21a and 21b. The end of the arm $22a_1$ first touches the projecting member 24b, and the arm 21a touches the projecting member 24b. Incidentally, the tape cassette loading apparatus may further comprise a damper which decelerates the opening speed of the holder 21.

The torsion coil springs 10 and 11 are respectively inserted into a corresponding one of the shafts 23a and 25a. One end of the torsion coil spring 10 is engaged with the tab 24c of the bracket 24, and the other end thereof is engaged with a notch part $22a_2$. One end of the torsion coil spring 11 is engaged with the tab 25c of the bracket 25, and the other end thereof is engaged with a notch part $22b_2$. The force $F_2=(L_1/L_2)*F_1$ is applied to the shaft 22c, and the moment $M_1=F_2*L_2$ is applied to the holder 3, where $F_1$; the force of the torsion spring 10 against the notch $22a_2$, $L_1$; the distance between the shaft 24a and the notch $22a_2$, and $L_2$; the distance between the shaft 24a and the shaft 22c.

A description will now be given of the operation of the holder 21 with reference to FIGS. 1, 8, and FIGS. 11 to 14. The holder 21 pivots from the cassette loading position $P_0$ to the cassette insert/eject position $P_3$ via a first middle position $P_1$ shown in FIG. 11 and a second middle position $P_2$ shown in FIG. 12. The opening angle of the holder 21 located at the cassette loading position $P_0$ is 0°, that of the holder 21 located at the first middle position $P_1$ is 16°, that of the holder 21 located at the second middle position $P_2$ is 21°, and that of the holder 21 located at the cassette insert/eject position $P_3$ is 25°. Hereupon, the state in which the opening angle of the holder 21 is within 0° to 16° is referred to as a first step, the state in which the opening angle of the holder 21 is within 16° to 21° is referred to as a second step, and the state in which the opening angle of the holder 21 is within 21° to 25° is referred to as a third step. When the holder 21 is located at the first middle position $P_1$, a lower part $22a_{1-0}$ of the bending part $22a_1$ touches the projecting member 24b. When the holder 21 is located at the second middle position $P_2$, a front surface $22a_{1-1}$ of the bending part $22a_1$ is completely engaged with the projecting member 24b.

Figure 14:
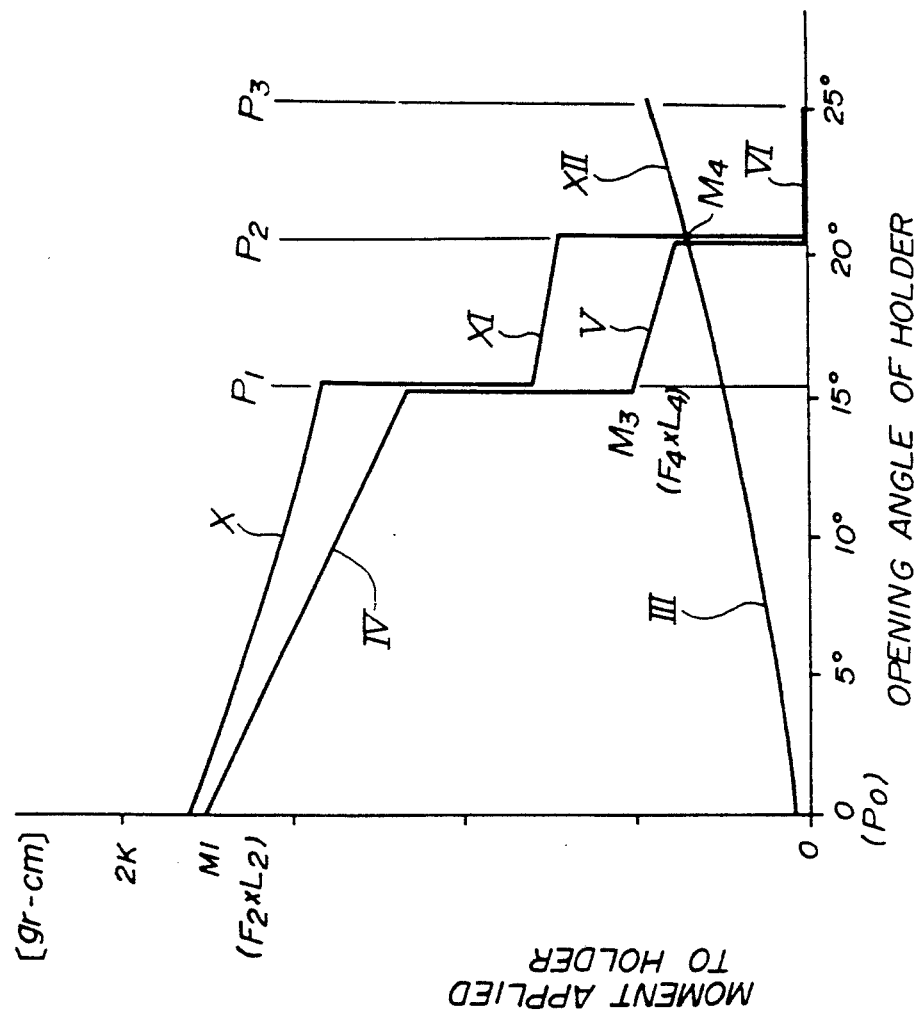
FIG. 14 shows a relationship between a moment which is applied to the holder and the opening angle thereof.

FIG. 14 shows a relationship between a moment which is applied to the holder 21 and the opening angle of the holder 21. As the holder 21 opens, the centroid G is separated from the tape cassette 2 and the base. Therefore, the moment which was applied to the holder 21 gradually increases as shown in FIG. 14III. Incidentally, the initial value of the moment is experimentally 40 g*m.

Next, a description will be given of the moment M which is applied to the holder 21 by the torsion coil spring 10 and the opening speed of the holder 21.

In the first step, as shown in FIG. 8, the aforementioned moment $M_1=F_1*L_2$ is initially applied to the holder 21. As the holder 21 pivots in the direction A, the spring force of the torsion spring 10 is gradually decreased, and accordingly the moment M is gradually decreased, as shown in FIG. 14. Incidentally, in the experiment, $L_2=3.10$ cm, $M_1=1.77*10^3$ g*cm, and $F_2=5.71*10^2$ g. As a result, the composite moment of the moments shown in FIGS. 14III and 14IV which is applied to the holder 21 is indicated as shown in FIG. 14X. The initial composite moment is experimentally $1.81*10^3$ g*cm. When the holder 21 rotates to 16°, the lower end $22a_{1-0}$ of the bending part $22a_1$ touches the projecting member 24b. Since the moment applied to the holder 21 is relatively large, as shown in O to $P_1$ section in FIG. 1III, the holder 21 opens at a relatively high speed.

Figure 11:
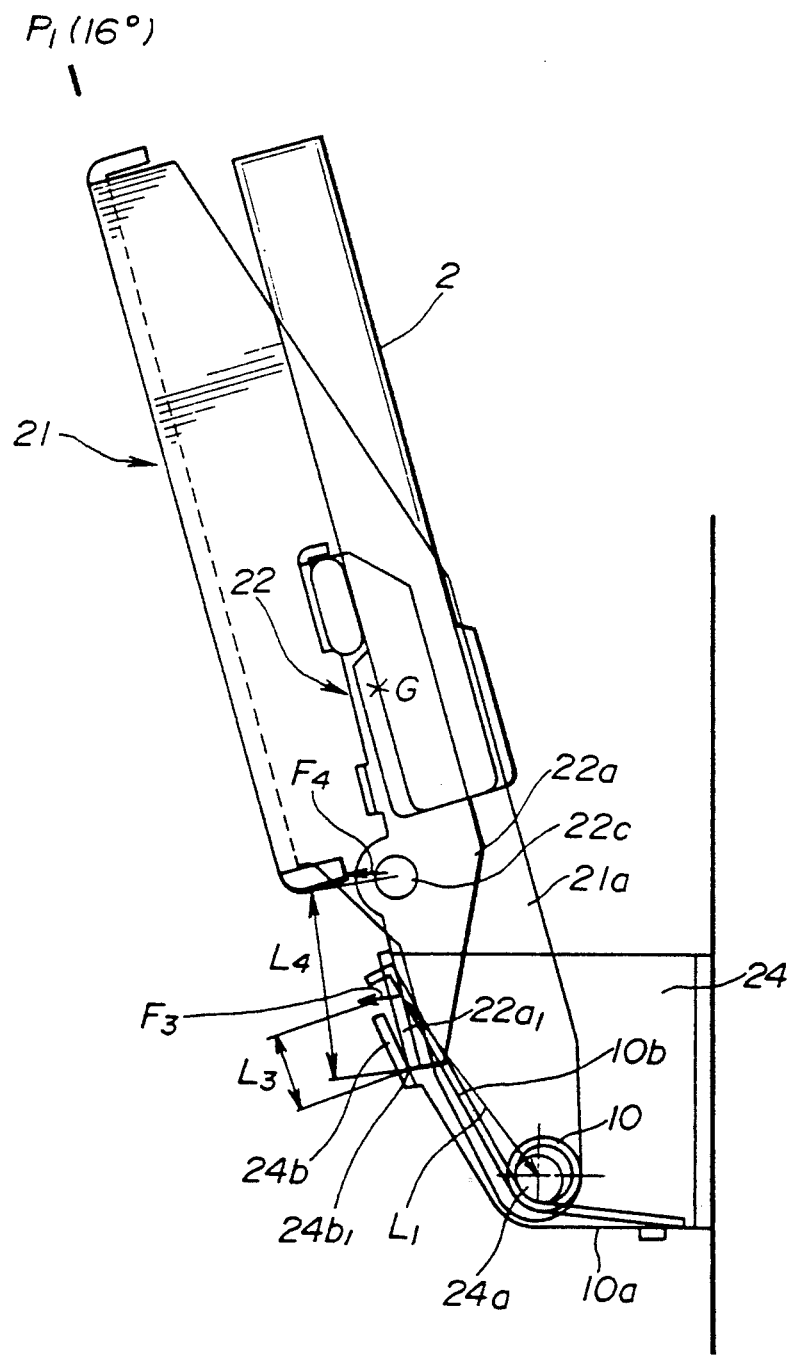
FIG. 11 shows a cross-sectional view of the tape cassette loading apparatus when the holder is located at a first middle position.

In the second step, as shown in FIG. 11, since the holder 21 pivots to 16° and the torsion spring 10 is biased in the reset direction thereof, the torsion spring 10 applies the force $F_3$ less than $F_1$ to the notch part $22a_2$. The distance between a touching part $24b_1$ of the projecting member 24b and the notch part $22a_2$ is assumed to be $L_3$, and the moment $M_2=F_3*L_3$ in the direction A is applied to the arm 22a around the touching part $24b_1$ which is to touch the lower end $22a_{1-0}$ of the bending part $24a_1$. In the experiment, $L_3=7.00*10^{-1}$, $M_2=5.40*10^2$ g*cm, $F_3=7.71*10^2$ g. On the other hand, if the distance between the touching part $24b_1$ and the shaft 22c is assumed to be $L_4$, the force $F_4=M_2/L_4$ is applied to the shaft 22c and the moment $M_3(=M_2)=F_4*L_4$ in the direction B is applied to the holder 21. In the experiment, $L_4=1.80$ cm, $M_3=5.40*10^2$ g*cm, and $F_4=3.00$ g. As the holder 21 further pivots in the direction A, since the spring force of the torsion spring 10 is accordingly decreased, the moment M is gradually decreased, as shown in FIG. 14V. The composite moment of the moments shown in FIGS. 14III and 14V is indicated as shown in FIG. 14XI. It is about half of the the composite moment shown in FIG. 14X. Therefore, the opening speed of the holder 21 is rapidly decreased as shown in the section $P_1$ to $P_2$ in FIG. 1III.

Figure 12:
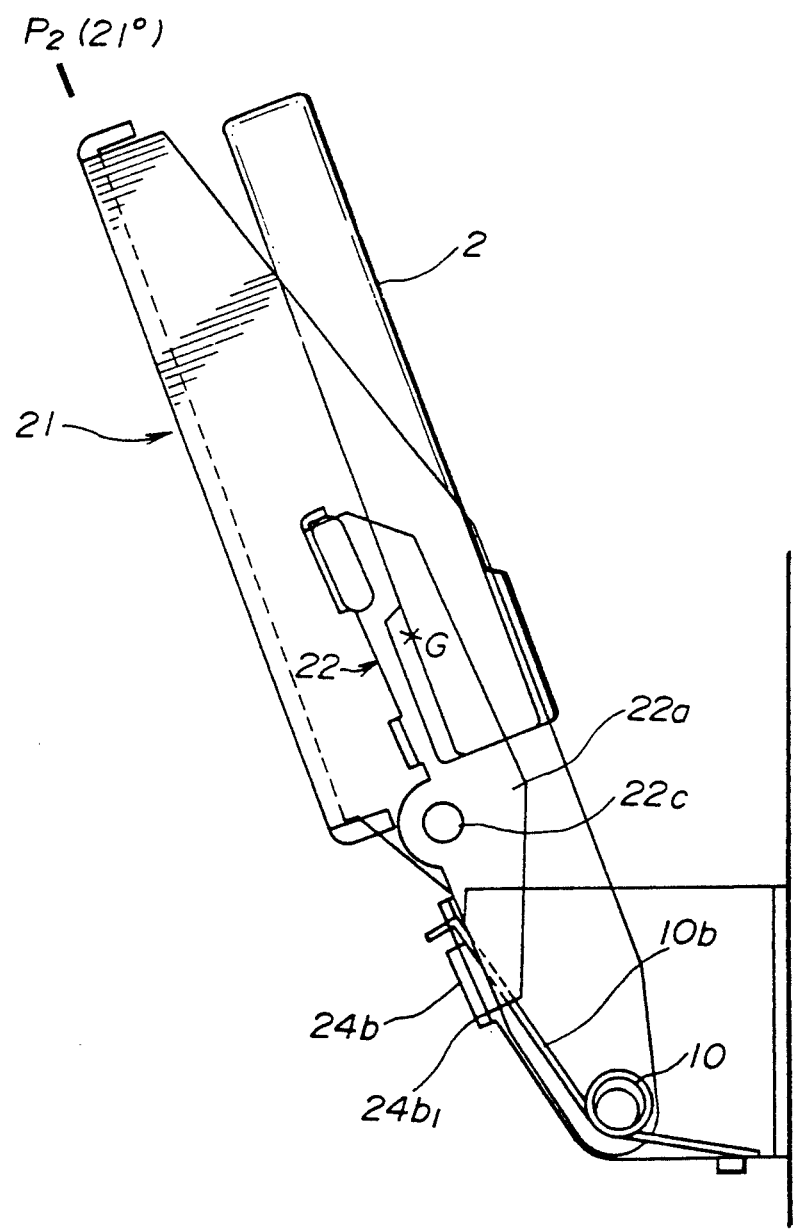
FIG. 12 shows a cross-sectional view of the tape cassette loading apparatus when the holder is located at a second middle position.
Figure 13:
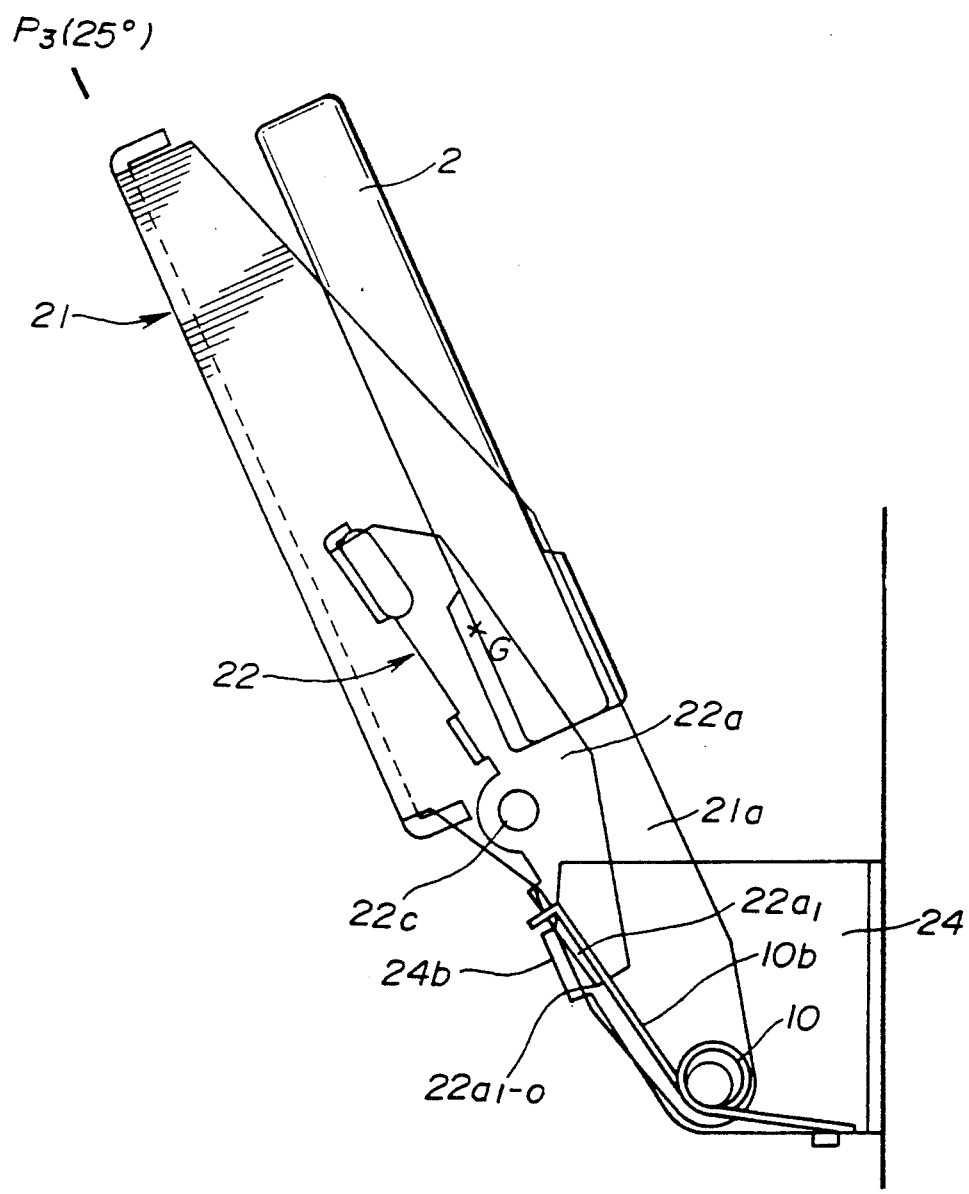
FIG. 13 shows a cross-sectional view of the tape cassette loading apparatus shown in FIG. 8.

In the third step, as shown in FIG. 12, since the holder 21 pivots to 21° and the front surface $22a_{1-1}$ of the bending part $22a_1$ is completely engaged with the projecting member 24b, $L_3$ becomes 0. The arms 21a and 21b are respectively adjacent to the projecting members 24b and 25b so as to hold the holder 21. Thus, the moment which is applied to the arm 22a becomes 0 and the moment M of the spring force applied to the holder 21 becomes 0 as shown in FIG. 14VI. In addition, the arms 22a and 22b pivot in the direction A separately from the holder 21. Incidentally, the moment $M_4$ in the direction A is applied to the holder 21 located at the second middle position $P_2$ because of the weight of the holder 21. In the experiment, $M_4=3.60*10^2$ g*cm. The moment M shown in FIG. 14XII, which is the same as the weight moment shown in FIG. 14III, is applied to the holder 21 located at the cassette insert/eject position $P_3$. Therefore, the opening speed of the holder is decreased as shown in section $P_2$ to $P_3$ in FIG. 1III.

Figure 15A:
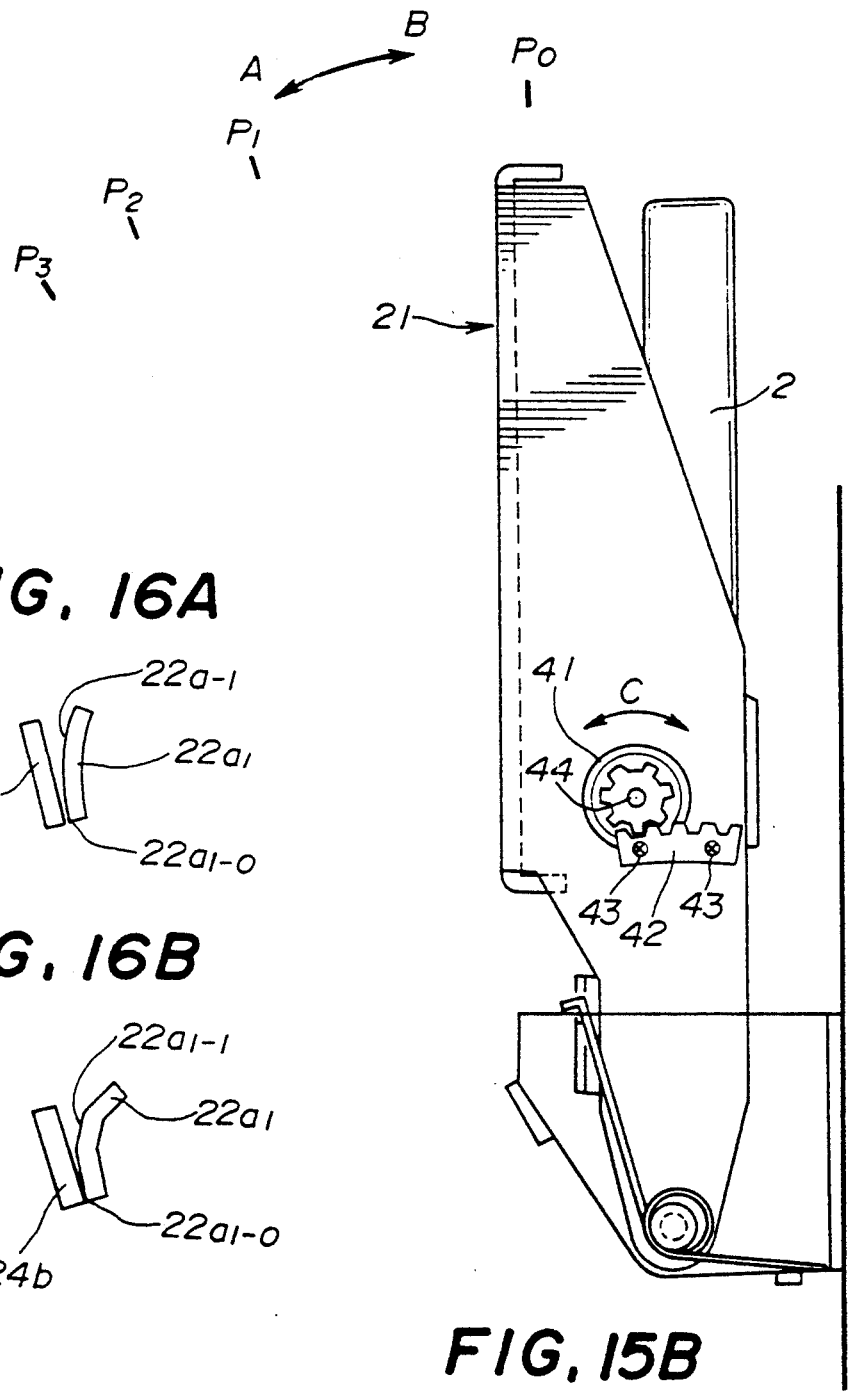
FIG. 15A is a perspective view of the damper mechanism.
Figure 15B:
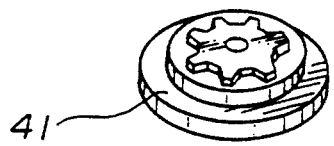
FIG. 15B is a perspective view of the gear shown in FIG. 15A.

As mentioned above, the holder 21 opens at a relatively high speed from the cassette loading position $P_0$ to the first middle position $P_1$, and is decelerated by the above two steps, the second step from the first middle position $P_1$ to the second middle position $P_2$ and the third step from the second middle position $P_2$ to the cassette insert/eject position $P_3$. Accordingly, the cassette holding member 22 pivots in the direction A separately from the holder 21. Therefore, the holder 21 opens from the cassette loading position $P_0$ to the cassette insert/eject position $P_3$ in a relatively short time. In addition, since the holder 21 stops at the cassette insert/eject position $P_3$ without any damage thereto, the tape cassette loading apparatus 1 can emit the high-grade atmosphere. When the holder 21 is located at the cassette insert/eject position P3, the tape cassette 2 can be inserted therein and/or ejected therefrom. Moreover, although the composite moment which is applied to the holder 21 stepwise duplicates the course shown in FIGS. 14X to 14XII, the opening speed of the holder 21 duplicates the course shown in FIG. 1I due to the damper mechanism (not shown). The damper mechanism may comprise a gear 41 which is supported pivotally in the base via a shaft 44, and a rack 42, engaged with the gear 41, which is screwed on the holder 21 by the screws 43. FIG. 15A shows a perspective view of the above gear 41, and FIG. 15B shows a plane view of the above damper mechanism. Incidentally, in FIG. 15B, the cassette pushing member 22 is omitted. Therefore, since the holder 21 opens by means of the engagement between the gear 41 and the rack 42, the abrupt change of the moment which is applied to the holder 21 is absorbed, so that, as shown in FIG. 1III, the opening speed of the holder is stepwisely decelerated.

Figure 16A:
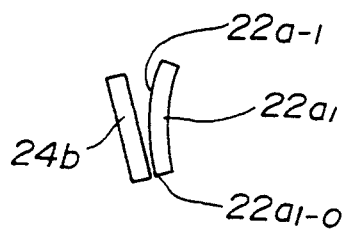
FIG. 16A shows the bending part formed as a circular arc shape.
Figure 16B:
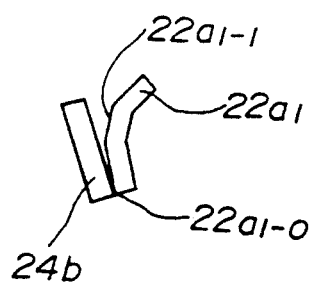
FIG. 16B shows the bending part formed as a polygon shape.

In the second step, the front surface $22a_{1-1}$ of the bending part $22a_1$ may be formed as a circular arc shape shown in FIG. 16A or a polygon shape shown in FIG. 16B. Thus, $L_3$ is gradually shortened as the holder 21 opens, so that the moment which is applied to the holder 21 can be gradually successively and/or stepwise decreased. On the contrary, the projecting member 24b may be formed as a circular arc shape or a polygon shape.

Further, the present invention is not limited to these preferred embodiments, but various variations and modifications may be made without departing from the scope of the present invention.

What is claimed is:

1. A tape cassette loading apparatus comprising:
   a holder, provided to be movable between a cassette insert/eject position at which a tape cassette is inserted therein and/or ejected therefrom and a cassette loading position at which the tape cassette is loaded in said cassette loading apparatus;
   a chassis on which said holder is pivotally supported;
   a forcing member, provided on said chassis, which forces said holder in a direction from the cassette loading position tot he cassette insert/eject position; and
   a cassette pushing means, pivotally supported in said holder and movable with said holder, which is engaged with said forcing member, for pushing the tape cassette so as to fix the inserted tape cassette in said holder, and which cassette pushing member can be engaged with an engaging portion provided on said chassis so as to pivot separately from said holder while said holder is moving from a middle position between the cassette loading position and the cassette insert/eject position to the cassette insert/eject position.

2. A tape cassette loading apparatus according to claim 1, wherein said cassette pushing means comprises a pushing member having a plane surface facing the tape cassette via which said cassette pushing means pushes the tape cassette, said pushing member being made of conductive and elastic material and contacting the tape cassette at said plane surface.

3. A tape cassette loading apparatus according to claim 2, wherein said plane surface of said pushing member has a width approximately equal to that of the tape cassette.

4. A tape cassette loading apparatus according to claim 1, wherein said cassette pushing member has a first engaging part having a first shape, and said chassis has a second engaging part having a second shape which si engaged with the first engaging part so that a distance between a pivotal point of said pushing member and the engaging point between said first and said second engaging parts changes while said holder is moving.

5. A tape cassette loading apparatus according to claim 4, wherein the first and second shapes are respectively formed so that the first engaging part can be stepwisely engaged with the second engaging part and a moving speed of said holder can be stepwisely decreased.

6. A tape cassette loading apparatus according to claim 5, wherein the first and second shapes are each formed as a plate, and said holder moves from the cassette loading position to the cassette insert/eject position by passing a first middle position and a second middle position located between the first middle position and cassette loading position, the first engaging part partially engaging with the second engaging part when the holder is moved to the first middle position, and the first engaging part completely engaging with the second engaging part when the holder is moved to the second middle position.

7. A tape cassette loading apparatus according to claim 5, wherein the first shape is formed as a polygon and the second shape is formed as a plate.

8. A tape cassette loading apparatus according to claim 4, wherein the first and second shapes are respectively formed so that the first engaging part can be continuously engaged with the second engaging part and a moving speed of said holder can be continuously decreased.

9. A tape cassette loading apparatus according to claim 8, wherein the first shape is formed as an approximately circular arc, and the second shape is formed as a plate.

10. A tape cassette loading apparatus according to claim 1, wherein said tape cassette loading apparatus further comprises a damper mechanism which restricts a moving speed of said holder.

11. A tape cassette loading apparatus according to claim 10, wherein said damper mechanism further comprises:
    a gear pivotally supported in said chassis;
    a rack, fixed on said holder, which is engaged with the gear, the gear engaging with the rack to move thereon as said holder moves.

12. A tape cassette loading apparatus comprising:
    a holder, provided to be movable between a cassette inset/eject position at which a tape cassette is inserted therein and/or ejected therefrom and a cassette loading position at which the tape cassette is loaded in said cassette loading apparatus;
    a chassis on which said holder is pivotally supported;
    forcing means for forcing said holder in a direction from the cassette loading position tot he cassette insert/eject position; and
    moving speed reducing means for reducing the moving speed of said holder by means of more than two steps while said holder is moving from the cassette loading position to the cassette insert/eject position.

13. A tape cassette apparatus comprising:

a holder, provided to be movable between a cassette insert/eject position at which a tape cassette is inserted therein and/or ejected therefrom and a cassette loading position at which the tape cassette is loaded in said cassette loading apparatus;

a chassis on which said holder is pivotally supported;

a forcing member, provided to said chassis, which forces said holder in a direction from the cassette loading position to the cassette insert/eject position; and a cassette pushing means, pivotally supported in said holder and movable with said holder, which is engaged with said forcing member, for pushing the tape cassette so as to fix the inserted tape cassette in said holder, said cassette pushing means comprises a pushing member having a plane surface facing the tape cassette via which said cassette pushing means pushes the tape cassette, said pushing member being made of conductive and elastic material and contacting to the tape cassette by said plane surface.

* * * * *